United States Patent
Aso et al.

(10) Patent No.: US 9,234,079 B2
(45) Date of Patent: Jan. 12, 2016

(54) METHOD FOR PRODUCING AQUEOUS MODIFIED POLYOLEFIN DISPERSION COMPOSITION

(71) Applicant: TOYOBO CO., LTD., Osaka (JP)

(72) Inventors: Hideo Aso, Hyogo (JP); Kenji Kashihara, Hyogo (JP); Kenichiro Isomoto, Hyogo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 14/384,235

(22) PCT Filed: Feb. 8, 2013

(86) PCT No.: PCT/JP2013/053013
§ 371 (c)(1),
(2) Date: Sep. 10, 2014

(87) PCT Pub. No.: WO2013/145884
PCT Pub. Date: Oct. 3, 2013

(65) Prior Publication Data
US 2015/0073081 A1 Mar. 12, 2015

(30) Foreign Application Priority Data

Mar. 29, 2012 (JP) .................................. 2012-076604
Mar. 29, 2012 (JP) .................................. 2012-076605

(51) Int. Cl.
| | | |
|---|---|---|
| C08K 5/15 | (2006.01) | |
| C08K 5/06 | (2006.01) | |
| C08J 3/05 | (2006.01) | |
| C08J 3/03 | (2006.01) | |
| C08L 23/28 | (2006.01) | |
| C08L 71/02 | (2006.01) | |

(52) U.S. Cl.
CPC .... *C08J 3/05* (2013.01); *C08J 3/03* (2013.01); *C08L 23/28* (2013.01); *C08L 71/02* (2013.01); *C08J 2351/06* (2013.01)

(58) Field of Classification Search
CPC ................................ C08J 3/05; C08J 2351/06
USPC ............................................................ 524/111
See application file for complete search history.

(56) References Cited

U.S. PATENT DOCUMENTS

| | | | |
|---|---|---|---|
| 2005/0143527 A1 | 6/2005 | Tsuneka et al. | |
| 2006/0004139 A1* | 1/2006 | Connelly et al. | 524/589 |
| 2010/0029836 A1* | 2/2010 | Hirose et al. | 524/522 |
| 2010/0035073 A1 | 2/2010 | Makino et al. | |

FOREIGN PATENT DOCUMENTS

| | | | |
|---|---|---|---|
| JP | 1-275636 | | 11/1989 |
| JP | 3-182534 | | 8/1991 |
| JP | 2930511 | | 5/1999 |
| JP | 2004-18659 | | 1/2004 |
| JP | 2005-36076 | | 2/2005 |
| JP | 2007-321105 | | 12/2007 |
| JP | 2008-163289 | | 7/2008 |
| JP | 2009-79078 | | 4/2009 |
| JP | 2010-84137 | | 4/2010 |
| JP | 2010084137 A | * | 4/2010 |
| WO | 2008/072760 | | 6/2008 |

OTHER PUBLICATIONS

Translation of JP 2010-084137, Apr. 15, 2010.*
International Search Report issued May 14, 2013 in International (PCT) Application No. PCT/JP2013/053013.

* cited by examiner

*Primary Examiner* — Hui Chin
(74) *Attorney, Agent, or Firm* — Wenderoth, Lind & Ponack, L.L.P.

(57) ABSTRACT

Provided is a method for producing an aqueous modified polyolefin dispersion composition that is industrially excellent, the method comprising the steps of preparing an aqueous modified polyolefin dispersion that does not contain a surfactant, and then mixing a specific surfactant, whereby foaming can be suppressed during the removal of the organic solvent, and the processing time can be significantly reduced. The method for producing an aqueous modified polyolefin dispersion composition comprises the steps (1) and (2):

(1) step 1 of obtaining an aqueous modified polyolefin dispersion using a modified polyolefin, an organic solvent, a base compound, and water as starting materials; and
(2) step 2 of mixing a surfactant with the aqueous modified polyolefin dispersion in an amount of 0.1 to 10 wt. % based on the weight of the modified polyolefin.

9 Claims, No Drawings

METHOD FOR PRODUCING AQUEOUS MODIFIED POLYOLEFIN DISPERSION COMPOSITION

TECHNICAL FIELD

The present invention relates to a method for producing an aqueous modified polyolefin dispersion composition that can be used as a component for imparting adhesion to polyolefin resins, such as polypropylene, for a wide range of applications, including coating materials, inks, adhesives, etc.

BACKGROUND ART

Polypropylene and other polyolefin resins are inexpensive and have excellent properties, such as mechanical physical properties and chemical properties. Hence, they are used in large amounts in a wide range of fields, including automobile etc. However, since polyolefin resins do not have a polar group in the molecule, they generally have a low polar surface, which problematically makes coating and bonding difficult.

For this reason, modified polyolefins are used for coating and bonding of polyolefin resins after being dissolved in organic solvents, such as toluene and xylene. However, making modified polyolefins water soluble is desirable in terms of environmental problems, safety-and-health problems, and the like, and many studies are being conducted on how to make modified polyolefins water soluble.

For example, PTL 1 discloses a method for obtaining an aqueous resin composition, the method comprising adding an amine to a toluene solution of acid-modified chlorinated polypropylene, adding a surfactant after mixing the mixture, gradually adding water for emulsification, and removing the toluene under reduced pressure. However, foaming is likely to occur in the step of removing the toluene due to the presence of the surfactant. This causes a problem of longer processing time because it is necessary to remove the toluene while suppressing foaming.

Moreover, PTL 2 discloses a method for obtaining an aqueous resin dispersion, the method comprising melting a modified polyolefin, mixing a surfactant and/or alcohol and amine as an auxiliary agent for making the modified polyolefin water soluble, and adding water at a high temperature and high pressure. However, since the modified polyolefin is made water soluble by melting, it is difficult to make the modified polyolefin water soluble if the melt viscosity is too high when the modified polyolefin is made water soluble. Thus, the molecular weight of usable modified polyolefin is limited. Furthermore, since it is substantially necessary to add a large amount of auxiliary agent for making the modified polyolefin water soluble, there are problems such that it is necessary to reduce the water resistance of the dry film of the aqueous resin dispersion, and that the device used for making the modified polyolefin water soluble should be a reactor having resistance under high temperature and high pressure.

In order to improve these problems, methods for producing an aqueous resin composition by reacting a modified polyolefin with a surfactant are being investigated. For example, PTL 3 and PTL 4 disclose production methods wherein an acid modified polyolefin is reacted with a hydrophilic polymer, and dissolved in an organic solvent, followed by addition of water for dispersion. However, since a large amount of hydrophilic polymer is substantially used in the reaction, there are problems such that the physical properties of the coating film as a coating agent are adversely affected; for example, the water resistance of the dry film of the aqueous resin dispersion is reduced.

In order to improve these problems, methods for producing an aqueous resin composition without using an auxiliary agent for making modified polyolefins water soluble are being investigated. For example, PTL 5 discloses a production method using a specific type of organic solvent.

CITATION LIST

Patent Literature

PTL 1: JPH3-182534A
PTL 2: JP2930511B
PTL 3: JP2007-321105A
PTL 4: JP2008-163289A
PTL 5: JP2009-79078A

SUMMARY OF INVENTION

Technical Problem

However, aqueous modified polyolefin resin dispersions that do not contain a surfactant have problems in long-term storage stability and mechanical stability. Further, their storage conditions may be limited, as compared to aqueous modified polyolefin resin dispersions in which an auxiliary agent for making modified polyolefins water soluble, such as a surfactant, adsorbs to the dispersion particles for protection. Moreover, aqueous modified polyolefin resin dispersions that do not contain a surfactant may have a problem in wettability to polyolefin substrates that have a low polar surface. That is, when an aqueous modified polyolefin resin dispersion is applied to the surface of a polyolefin substrate and dried to form a dry coating film, a uniform dry coating film is obtained through a process in which the dispersion particles are fused together while water evaporates; however, since an aqueous modified polyolefin resin dispersion that does not contain a surfactant has inferior wettability to polyolefin resins, it is difficult to obtain a uniform dry coating film when the dispersion is applied to the surface of a polyolefin substrate. As a result, various physical properties of the coating film, such as the adhesion to the polyolefin substrate, may be reduced.

An object of the present invention is to provide a method for efficiently producing an aqueous modified polyolefin dispersion composition having excellent adhesion and water resistance, the method comprising specific steps, whereby foaming can be suppressed during the removal of the organic solvent, and the processing time can be reduced.

Solution to Problem

As a result of extensive research to achieve the above object, the present inventors found that the above object can be achieved by employing the following method for producing an aqueous modified polyolefin dispersion composition. The present invention has thus been completed.

More specifically, the present invention relates to a method for producing the following aqueous modified polyolefin dispersion composition. In the present application, aqueous dispersion compositions before a surfactant is mixed are referred to as "aqueous modified polyolefin dispersions," and aqueous dispersion compositions after a surfactant is mixed are referred to as "aqueous modified polyolefin dispersion compositions," for convenience.

Item 1

A method for producing an aqueous modified polyolefin dispersion composition comprising the steps (1) and (2):

(1) step 1 of obtaining an aqueous modified polyolefin dispersion using a modified polyolefin, an organic solvent, a base compound, and water as starting materials; and (2) step 2 of mixing a surfactant with the aqueous modified polyolefin dispersion in an amount of 0.1 to 10 wt. % based on the weight of the modified polyolefin.

Item 2

The production method according to Item 1, wherein the modified polyolefin is an acid-modified polyolefin and/or an acid-modified chlorinated polyolefin.

Item 3

The production method according to Item 1 or 2, wherein the modified polyolefin has an acid value of 5 to 50 KOHmg/g.

Item 4

The production method according to any one of Items 1 to 3, wherein the acid-modified chlorinated polyolefin has a chlorine content of 10 to 35 wt. %.

Item 5

The production method according to any one of Items 1 to 4, wherein the modified polyolefin has a weight average molecular weight of 10,000 to 150,000.

Item 6

The production method according to any one of Items 1 to 5, wherein the modified polyolefin is obtained by acid-modifying a propylene-α-olefin copolymer, or by acid-modifying a propylene-α-olefin copolymer, followed by chlorination, and the propylene-α-olefin copolymer has a propylene component content of 60 to 97 mol %.

Item 7

The production method according to Item 6, wherein the propylene-α-olefin copolymer is a propylene-α-olefin copolymer synthesized using a metallocene catalyst.

Item 8

The production method according to any one of Items 1 to 7, wherein the organic solvent includes at least an ether-based solvent.

Item 9

The production method according to any one of Items 1 to 8, wherein the surfactant is a nonionic surfactant having an HLB of 9 or more.

Item 10

The production method according to Item 9, wherein the nonionic surfactant having an HLB of 9 or more is at least one member selected from the group consisting of polyoxyalkylene alkyl ether-based surfactants, polyoxyalkylene styrenated phenyl ether-based surfactants, polyoxyalkylene alkyl phenyl ether-based surfactants, polyoxyalkylene alkyl amine-based surfactants, polyoxyalkylene amine-based surfactants, polyoxyalkylene alkyl amide-based surfactants, polyoxyalkylene fatty acid ester-based surfactants, ethylene oxide-propylene oxide block polymer-based surfactants, ethylene oxide-propylene oxide random polymer-based surfactants, and polyoxyethylene sorbitan fatty acid ester-based surfactants.

Advantageous Effects of Invention

Due to the specific steps, the method for producing an aqueous modified polyolefin dispersion composition according to the present invention can prevent foaming during the removal of the organic solvent, and can significantly reduce the processing time. Furthermore, because a surfactant is mixed after the organic solvent is removed, the type and amount of surfactant can be suitably selected depending on the application of the aqueous modified polyolefin dispersion composition. The obtained aqueous modified polyolefin dispersion composition has excellent adhesion and water resistance.

DESCRIPTION OF EMBODIMENTS

The present invention is described in detail below.

The present invention is a method for producing an aqueous modified polyolefin dispersion composition, the method comprising obtaining an aqueous modified polyolefin dispersion using a modified polyolefin, an organic solvent, a base compound, and water as starting materials; then removing the organic solvent; and further mixing a surfactant in an amount of 0.1 to 10 wt. % based on the weight of the modified polyolefin.

The production method of the present invention having the above feature can produce an aqueous modified polyolefin dispersion composition having excellent adhesion and water resistance, by preparing an aqueous modified polyolefin dispersion that does not contain a surfactant, and then mixing a necessary amount of surfactant with the aqueous modified polyolefin dispersion.

The modified polyolefin used in the present invention is, for example, an acid-modified polyolefin and/or an acid-modified chlorinated polyolefin.

Preferred examples of acid-modified polyolefins include those obtained by reacting a polypropylene and/or a propylene-α-olefin copolymer with α,β-unsaturated carboxylic acid and/or acid anhydrides thereof.

The propylene-α-olefin copolymer is obtained by copolymerizing propylene, which is used as a main component, and an α-olefin. Preferred examples of α-olefins include, but are not particularly limited to, α-olefins having 2 to 8 carbon atoms. Specific examples of α-olefins include ethylene, 1-butene, 1-heptene, 1-octene, and the like, which can be used singly or in combination of two or more. Among these α-olefins, ethylene and/or 1-butene are preferred. Although the ratio of the propylene component and the α-olefin component in the propylene-α-olefin copolymer is not particularly limited, it is preferable that the propylene component is 60 to 97 mol %, and the α-olefin component is 40 to 3 mol %, in terms of the control of the crystallinity and melting point as a coating agent; and it is more preferable that the propylene component is 70 to 95 mol %, and the α-olefin component is 30 to 5 mol %.

Preferred examples of the polypropylene and the propylene-α-olefin copolymer include those synthesized using a metallocene catalyst, because they have uniform crystallinity and excellent solubility in solvents. Moreover, it is preferable that the polypropylene and the propylene-α-olefin copolymer are both isotactic polymers. Isotactic polymers have a relatively high degree of crystallinity. In the case of acid-modified chlorinated polyolefins in the form of isotactic polymers, their crystallinity can be controlled by a chlorination reaction. For example, when the polypropylene and the propylene-α-olefin copolymer are made soluble in various organic solvents, their crystallinity can be reduced by increasing the chlorine content. When the coating film of the polypropylene and the propylene-α-olefin copolymer is made cohesive, high crystallinity can be maintained by setting the chlorine content at a low level, although the solubility in organic solvents decreases. For this, it is necessary to reduce the crystallinity at least to a level that enables dissolution in organic solvents.

The melting point of the polypropylene and the propylene-α-olefin copolymer is not particularly limited, but is preferably 50 to 130° C., and more preferably 60 to 90° C., in terms of use as a coating agent.

Examples of α,β-unsaturated carboxylic acid and acid anhydrides thereof to be reacted with a polypropylene and a propylene-α-olefin copolymer include, but are not particularly limited to, maleic acid, itaconic acid, and acid anhydrides thereof. Among these, maleic acid anhydride is preferred. The amount to be added to a polypropylene and a propylene-α-olefin copolymer is such that the acid value is preferably in the range of 5 to 50 KOHmg/g (mgKOH/g), and more preferably 10 to 30 KO mg/g.

When the acid value is less than 5 KOHmg/g, it may be difficult to disperse the acid-modified polyolefin in water without using a surfactant. When the acid value exceeds 50 KOHmg/g, the proportion of the polar component is unduly high, which may reduce the water resistance of the dry coating film. The acid value can be measured according to JIS K5902.

A known method, such as a solution method or a melting method, can be used to react a polypropylene and a propylene-α-olefin copolymer with at least one member selected from the group consisting of α,β-unsaturated carboxylic acid and acid anhydrides thereof.

In the solution method, for example, a polypropylene and a propylene-α-olefin copolymer are dissolved in an organic solvent at 80 to 180° C., then a radical generator and at least one member selected from the group consisting of α,β-unsaturated carboxylic acid and acid anhydrides thereof are added thereto, and the mixture is reacted for a predetermined period of time. Preferred examples of organic solvents include aromatic hydrocarbons, such as toluene and xylene.

In the melting method, for example, a polypropylene and a propylene-α-olefin copolymer are melted at 180 to 300° C., then a radical generator and at least one member selected from the group consisting of α,β-unsaturated carboxylic acid and acid anhydrides thereof are added thereto, and the mixture is reacted for a predetermined period of time.

Examples of radical generators include benzoyl peroxide, dicumyl peroxide, di-t-butyl peroxide, t-butyl peroxybenzoate, t-hexyl hydroperoxide, and the like, which can be selected depending on the reaction temperature and the decomposition temperature.

The weight average molecular weight of the acid-modified polyolefin is preferably 10,000 to 150,000, and more preferably 30,000 to 120,000. When the weight average molecular weight is less than 10,000, the cohesion of the dry coating film is weakened, which may reduce adhesion to the polyolefin substrate. When the weight average molecular weight exceeds 150,000, the solubility of the acid-modified polyolefin in the organic solvent decreases when the acid-modified polyolefin is made water soluble, which may make it impossible to disperse the acid-modified polyolefin in water. The weight average molecular weight can be measured by GPC (gel permeation chromatography). In the present invention, the weight average molecular weight was measured in terms of standard polystyrene using e2695 Separations Module and 2998 PDA Photodiode Array (PDA) Detector (both produced by Waters Corporation). The measurement conditions are as follows: apparatus (column: Shodex Packed Column for HPLC KF-806M+KF-803, mobile-phase solvent: THF (100%), column temperature: 40° C., flow rate: 1.23 ml/min, sample concentration: 0.3 wt %), detector (injection volume: 100 μl, temperature: 25° C.).

Examples of acid-modified chlorinated polyolefins to be used in the present invention include those obtained by chlorinating the acid-modified polyolefins mentioned above.

A known method can be used to chlorinate an acid-modified polyolefin. For example, an acid-modified polyolefin is dissolved in a chlorine-based organic solvent at 100 to 120° C., and chlorine gas is introduced into the mixture in the presence or absence of a radical generator in an atmosphere at 90 to 110° C. until the chlorine content is 10 to 35 wt. %. Examples of chlorine-based solvents include chloroform, tetrachloroethylene, tetrachloroethane, and the like. Among these, chloroform is preferred.

The acid value of the acid-modified chlorinated polyolefin is preferably within the range of 5 to 50 KOHmg/g, and more preferably 10 to 30 KOHmg/g. When the acid value is less than 5 KOHmg/g, it may be difficult to disperse the acid-modified chlorinated polyolefin in water without using a surfactant. When the acid value exceeds 50 KOHmg/g, the proportion of the polar component is unduly high, which may reduce the water resistance of the dry coating film. The acid value can be measured according to JIS K5902.

The chlorine content of the acid-modified chlorinated polyolefin is preferably 10 to 35 wt. %, and more preferably 14 to 25 wt. %. When the chlorine content is less than 10 wt. %, the crystallinity of the acid-modified chlorinated polyolefin may be high. As a result, the solubility of the acid-modified chlorinated polyolefin in the organic solvent decreases when the acid-modified chlorinated polyolefin is made water soluble, which may make it impossible to disperse the acid-modified chlorinated polyolefin in water. When the chlorine content exceeds 35 wt. %, the crystallinity of the acid-modified chlorinated polyolefin is unduly low, and the cohesion of the dry coating film is weakened, which may reduce adhesion to the polyolefin substrate. The chlorine content can be measured according to JIS K7229.

The weight average molecular weight of the acid-modified chlorinated polyolefin is preferably 10,000 to 150,000, and more preferably 30,000 to 120,000. When the weight average molecular weight is less than 10,000, the cohesion of the dry coating film is weakened, which may reduce adhesion to the polyolefin substrate. When the weight average molecular weight exceeds 150,000, the solubility of the acid-modified chlorinated polyolefin in the organic solvent decreases when the acid-modified chlorinated polyolefin is made water soluble, which may make it impossible to disperse the acid-modified chlorinated polyolefin in water. The weight average molecular weight can be measured by GPC (gel permeation chromatography). In the present invention, the weight average molecular weight was measured in terms of standard polystyrene using e2695 Separations Module and 2998 PDA Detector (both produced by Waters Corporation).

The aqueous modified polyolefin dispersion composition of the present invention may be produced in the following manner. An aqueous modified polyolefin dispersion is obtained using a modified polyolefin, an organic solvent, a base compound, and water as starting materials, and the organic solvent is then removed, thereby producing an aqueous modified polyolefin dispersion that does not contain a surfactant. Thereafter, a surfactant is further mixed in an amount of 0.1 to 10 wt. % based on the weight of the modified polyolefin.

This is described for each step.

Step 1

In step 1, an aqueous modified polyolefin dispersion that does not contain a surfactant is prepared.

The organic solvent used is preferably an organic solvent having an ether bond in the molecule (an ether-based solvent).

Specifically, it is preferable to use at least one or more of tetrahydrofuran, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, and the like; however, the organic solvent is not limited thereto. More preferred are tetrahydrofuran and/or propylene glycol mono-n-propyl ether. It is even more preferable to use two or more of the above organic solvents in combination, because the solubility of the modified polyolefin can be controlled based on the change in the amount of the polar component in the modified polyolefin. In addition, if necessary, an aromatic hydrocarbon (e.g., toluene), an aliphatic hydrocarbon (e.g., n-heptane), an alicyclic hydrocarbon (e.g., methylcyclohexane), a ketone-based solvent (e.g., methyl ethyl ketone), an ester-based solvent (e.g., ethyl acetate), or an alcohol solvent (e.g., isopropyl alcohol) can be used in combination with an aforementioned ether-based solvent.

The base compound is preferably ammonia or a volatile organic amine compound having a boiling point of 30 to 250° C., preferably a volatile organic amine compound having a boiling point of 50 to 200° C. When the boiling point of the volatile organic amine compound is less than 30° C., a larger amount of organic amine compound is volatilized when the modified polyolefin is made water soluble, and making the modified polyolefin water soluble may not completely proceed. When the boiling point of the volatile organic amine compound exceeds 250° C., it is difficult to disperse the organic amine compound from the resin coating by drying, which may reduce the water resistance of the coating. Specific examples of volatile organic amine compounds include, but are not particularly limited to, primary amines, such as ethylamine, propylamine, isopropylamine, and 3-methoxypropylamine; secondary amines, such as diethylamine, dipropylamine, and dibutylamine; tertiary amines, such as trimethylamine and triethylamine; alicyclic amines, such as morpholine, N-methylmorpholine, and N-ethylmorpholine; and hydroxyl group-containing amines, such as ethanolamine, diethanolamine, triethanolamine, dimethylethanolamine, N-methyl-N,N-diethanolamine, and 2-amino-2-methyl-1-propanol. These are used singly or in combination of two or more.

In the present invention, first, a modified polyolefin is dissolved in an organic solvent. The amount of organic solvent as a solid content is preferably 20 to 70 wt. %, more preferably 25 to 65 wt. %, and even more preferably 30 to 60 wt. %. When the solid content is less than 20 wt. %, the solution is too diluted to be suitable for efficient production. When the solid content exceeds 70 wt. %, the modified polyolefin does not dissolve in the organic solvent, or a high temperature is required to dissolve the modified polyolefin, which may have an adverse impact on the quality. Moreover, the dissolution temperature is preferably 50 to 100° C., more preferably 55 to 95° C., and even more preferably 60 to 90° C.

A base compound may be mixed either before or after the modified polyolefin is dissolved. The amount of basic compound is preferably 1 to 5 chemical equivalents, more preferably 1 to 4 chemical equivalents, and even more preferably 1 to 3 chemical equivalents, based on the carboxyl groups of the modified polyolefin. When the amount is less than 1 equivalent, the carboxyl groups of the modified polyolefin may not be sufficiently neutralized. When the amount exceeds 5 equivalents, the basicity is unduly high, which may disrupt the acid-base balance in the dispersion, resulting in an extremely high viscosity.

After neutralization with a basic compound, water is added. The amount of water is preferably 1 to 10 times by weight, more preferably 2 to 8 times by weight, and even more preferably 3 to 6 times by weight, based on the weight of the modified polyolefin. The temperature of water to be added is not particularly limited; however, it is preferably about the same as the dissolution temperature of the organic solvent in terms of operation. Moreover, the gradual addition of water can induce a phase inversion from a W/O type (water-in-oil type) dispersion to an O/W type (oil-in-water type) dispersion.

After phase inversion, the organic solvent is removed together with part of the water under reduced pressure. The degree of reduced pressure can be suitably determined in relation to the temperature. For example, the temperature is preferably 50 to 120° C., more preferably 60 to 110° C., and even more preferably 70 to 100° C.; while the pressure is preferably an absolute pressure of 50 to 100 kPa, more preferably 60 to 95 kPa, and even more preferably 80 to 90 kPa. The weight composition ratio of the aqueous modified polyolefin dispersion after the organic solvent is removed is preferably modified polyolefin:base compound:water=1:0.005 to 0.10:1 to 4. Although it is preferable to completely remove the organic solvent at this time, doing so is, in fact, difficult in industrial areas; thus, the amount of residual organic solvent may be 1 wt. % or less, preferably 0.1 wt. % or less, and more preferably 0.01 wt. % or less, based on the weight of the modified polyolefin.

Other examples of the method include, but are not particularly limited to, a method for producing an aqueous modified polyolefin dispersion, the method comprising initially mixing a base compound and water, as well as a modified polyolefin and an organic solvent, to disperse the resin in the water, and then removing the solvent; and a method comprising mixing a modified polyolefin, an organic solvent, and water for dissolution, then adding a base compound, and removing the solvent.

Step 2

In step 2, a surfactant is mixed with the aqueous modified polyolefin dispersion, thereby producing an aqueous modified polyolefin dispersion composition.

Examples of surfactants include, but are not particularly limited to, cationic surfactants, anionic surfactants, and nonionic surfactants. Among these, nonionic surfactants are preferred. Moreover, nonionic surfactants having an HLB of 9 or more are particularly preferred in terms of excellent long-term storage stability. HLB (an acronym for Hydrophile-Lipophile Balance) is an indicator that shows the balance of hydrophilicity and lipophilicity of a surfactant. In this system, created by Mr. Griffin, the greater the HLB value, the more the hydrophilicity increases. In step 2, when a nonionic surfactant having an HLB of less than 9 is used, the lipophilicity of the surfactant is unduly high, which results in a smaller effect of improving the storage stability of the aqueous modified polyolefin dispersion. In some cases, the storage stability may be lower than that of an aqueous acid-modified polyolefin dispersion composition that does not contain a surfactant. The HLB of the nonionic surfactant is more preferably 12 or more. The upper limit of HLB is not particularly limited, but is generally 20, preferably 19, and more preferably 18.

Due to its function of reducing interfacial tension, the surfactant exhibits a remarkable effect when the aqueous modified polyolefin resin dispersion is applied to a polyolefin resin substrate that has a low polar surface.

The type of nonionic surfactant is not particularly limited, as long as the HLB is 9 or more. Examples thereof include polyoxyalkylene alkyl ether-based surfactants, such as polyoxyethylene lauryl ether (the alkylene is preferably linear or branched $C_{2-4}$ alkylene, and the alkyl is preferably linear or branched $C_{10-18}$ alkyl); polyoxyalkylene styrenated phenyl ether-based surfactants, such as polyoxyethylene styrenated phenyl ether; polyoxyalkylene alkyl phenyl ether-based surfactants, such as polyoxyethylene nonyl phenyl ether; polyoxyalkylene alkyl amine-based surfactants, such as polyoxyethylene stearyl amine; polyoxyalkylene amine-based surfactants, such as polyoxyethylene polyoxypropylene monoamine; polyoxyalkylene alkyl amide-based surfactants, such as polyoxyethylene oleyl amide; polyoxyalkylene fatty acid ester-based surfactants, such as polyoxyethylene monolaurate; ethylene oxide-propylene oxide block polymer-based surfactants and ethylene oxide-propylene oxide random polymer-based surfactants, such as polyoxyethylene polyoxypropylene glycol and polyoxyethylene polyoxypropylene tridecyl ether; polyoxyethylene sorbitan fatty acid ester-based surfactants, such as polyoxyethylene sorbitan monostearate; and the like. These surfactants can be used singly or in combination of two or more.

The amount of surfactant is preferably 0.1 to 10 wt. %, more preferably 0.5 to 9 wt. %, and even more preferably 1 to 8 wt. %, based on the weight of the modified polyolefin. This can ensure long-term storage stability of the aqueous modified polyolefin dispersion composition and wettability to low polar polyolefin substrates, and can prevent a reduction in the water resistance of the dry coating film. Furthermore, since no surfactant is used in step 1 of the present invention, the type and amount of surfactant used in subsequent step 2 are not limited, and a surfactant suitable for the improvement in wettability to polyolefin substrates can be selected from a wide range of surfactants. Thus, aqueous modified polyolefin dispersion compositions can be efficiently obtained. In addition, foaming due to the presence of a surfactant in step 1 can be suppressed in the step of removing the organic solvent; therefore, the production method of the present invention is industrially excellent.

The method of mixing a surfactant is not particularly limited. For example, a surfactant may be mixed without dilution in water, etc., or may be mixed in the form of a 1 to 50 wt. % dilute aqueous solution. For immediate mixing with the aqueous modified polyolefin dispersion, it is preferable to mix a surfactant in the form of a 1 to 50 wt. % dilute aqueous solution. When a surfactant in the form of an aqueous solution is mixed with the aqueous modified polyolefin dispersion, the surfactant immediately adsorbs to the particles.

The volume-based mean particle diameter of the resin in the aqueous modified polyolefin dispersion composition is preferably 500 nm or less, and more preferably 200 nm or less. A volume-based mean particle diameter exceeding 500 nm is not preferable, because the coating film after coating may be damaged, and various physical properties may be adversely affected. The volume-based mean particle diameter was measured by a Zetasizer Nano ZS (produced by Malvern Instruments, Ltd.).

After the surfactant is mixed, for example, water may be added or removed to adjust the concentration.

EXAMPLES

The present invention is described in detail below with reference to Examples and Comparative Examples. However, the present invention is not limited to these Examples.

Production Example 1

Acid-Modified Polyolefin

A propylene-ethylene copolymer (750 g; propylene:ethylene=93:7 (molar ratio), melting point: 75° C., melt viscosity at 180° C.: 1,500 mPa·s; produced by using a metallocene catalyst), 90 g of maleic acid anhydride, 15 g of dicumyl peroxide, and 1,100 g of toluene were placed in a 3 L stainless steel autoclave reactor, and the reactor was sealed. After the air in the autoclave was replaced with nitrogen, the reactor was heated, and the mixture was reacted at a reactor inner temperature of 140° C. for 5 hours. The reaction solution was cooled to 110° C., and placed in a 10 L stainless steel container containing 3,500 g of methyl ethyl ketone (hereinafter also referred to as "MEK"). After the resin was precipitated from the reaction solution, solid-liquid separation was performed. Further, the resin after solid-liquid separation was placed in 1,000 g of MEK, and washing was repeated 3 times for solid-liquid separation again, followed by drying of the resin. The acid value of the obtained maleic acid anhydride-modified propylene-ethylene copolymer was 26 KOHmg/g, and the weight average molecular weight thereof was 34,000.

Production Example 2

Acid-Modified Polyolefin

The same operation as in Production Example 1 was performed, except that the amount of maleic acid anhydride was changed to 23 g. The acid value of the obtained maleic acid anhydride-modified propylene-ethylene copolymer was 11 KOHmg/g, and the weight average molecular weight thereof was 40,000.

Production Example 3

Acid-Modified Polyolefin

The same operation as in Production Example 1 was performed, except that the polyolefin resin was changed to a propylene-1-butene copolymer synthesized using a metallocene catalyst (propylene:1-butene=78:22 (molar ratio), melting point: 85° C., MFR at 230° C.: 7 g/10 min). The acid value of the obtained maleic acid anhydride-modified propylene-1-butene copolymer was 18 KOHmg/g, and the weight average molecular weight thereof was 68,000.

Production Example 4

Acid-Modified Polyolefin

The same operation as in Production Example 1 was performed, except that the propylene-ethylene copolymer was changed to isotactic polypropylene (melt viscosity at 180° C.: 1,500 mPa·s).

Production Example 5

Acid-Modified Polyolefin

The same operation as in Production Example 3 was performed, except that dicumyl peroxide was changed to t-butyl peroxybenzoate, and the reaction conditions were changed to 120° C. for 5 hours. The acid value of the obtained maleic acid anhydride-modified propylene-1-butene copolymer was 23 KOHmg/g, and the weight average molecular weight thereof was 117,000.

Production Example 6

Acid-Modified Chlorinated Polyolefin

The maleic acid anhydride-modified polypropylene (500 g) obtained in Production Example 4 and 8,500 g of chloroform were placed in a 5 L glass-lined reactor, and the reactor was sealed. While stirring the solution in the reactor for dispersion, the reactor was heated, and the polypropylene was dissolved in the chloroform at a reactor inner temperature of 120° C. for 1 hour. After the temperature in the reactor was cooled to 110° C., 2.5 g of t-butyl peroxy-2-ethylhexanoate was added. Then, chlorine was immediately introduced at a rate of 120 g/hour, and the temperature in the reactor was maintained at 100 to 120° C. The upper limit of the pressure in the reactor was set to be 0.4 MPa. When the pressure reached the upper limit, the gas in the system was discharged to a trap of water and a trap of an aqueous sodium hydroxide solution outside the system. The introduction of chlorine was stopped when 348 g of chlorine was introduced after 2 hours and 50 minutes passed from the start of chlorine introduction. After the solution was continuously stirred for 10 minutes, the temperature in the reactor was cooled to 60° C., and 7,000 g of chloroform was removed under the conditions in which the temperature in the reactor was 35 to 60° C., and the degree of reduced pressure was 0.05 to 0.08 MPa. To the obtained reaction solution, 18 g of p-t-butylphenyl glycidyl ether was added as a stabilizer, followed by drying, thereby obtaining maleic acid anhydride-modified chlorinated polypropylene. The chlorine content of the obtained maleic acid anhydride-modified chlorinated polypropylene was 23 wt. %, the acid value thereof was 16 KOHmg/g, and the weight average molecular weight thereof was 42,000.

Production Example 7

Acid-Modified Chlorinated Polyolefin

The same operation as in Production Example 6 was performed, except that the maleic acid anhydride-modified polypropylene was changed to the resin obtained in Production Example 2, and the amount of chlorine introduced was changed to 237 g. The chlorine content of the obtained maleic acid anhydride-modified chlorinated polypropylene was 17 wt. %, the acid value thereof was 10 KOHmg/g, and the weight average molecular weight thereof was 38,000.

Production Example 8

Acid-Modified Chlorinated Polyolefin

The same operation as in Production Example 6 was performed, except that the maleic acid anhydride-modified polypropylene was changed to the resin obtained in Production Example 1, and the amount of chlorine introduced was changed to 186 g. The chlorine content of the obtained maleic acid anhydride-modified chlorinated propylene-ethylene copolymer was 14 wt. %, the acid value thereof was 19 KOHmg/g, and the weight average molecular weight thereof was 75,000.

Production Example 9

Acid-Modified Chlorinated Polyolefin

The same operation as in Production Example 6 was performed, except that the amount of chlorine introduced was changed to 389 g. The chlorine content of the obtained maleic acid anhydride-modified chlorinated propylene-ethylene copolymer was 25 wt. %, the acid value thereof was 22 KOHmg/g, and the weight average molecular weight thereof was 118,000.

Production Example 10

Aqueous Acid-Modified Polyolefin Dispersion

The maleic acid anhydride-modified propylene-ethylene copolymer (350 g) obtained in Production Example 1, 585 g of tetrahydrofuran, and 65 g of propylene glycol monopropyl ether were placed in a 3 L flask equipped with a stirrer, and the mixture was heated to 65° C. for dissolution. Then, 22 g of 50 wt. % aqueous solution of 2-amino-2-methyl-1-propanol was added thereto. While maintaining the temperature at 65° C., ion exchange water at 60° C. was gradually added dropwise. After 1,000 g of ion exchange water was added dropwise over 1 hour, the tetrahydrofuran and propylene glycol monopropyl ether were removed for 1.5 hours at an absolute pressure of 93 kPa. The total residual volume of tetrahydrofuran and propylene glycol monopropyl ether was 1 wt. % or less based on the maleic acid anhydride-modified propylene-ethylene copolymer. Subsequently, ion exchange water was added so that the solid content was 30 wt. %, thereby obtaining a milky aqueous modified polyolefin dispersion. The composition of the obtained aqueous modified polyolefin dispersion was maleic acid anhydride-modified propylene-ethylene copolymer:2-amino-2-methyl-1-propanol:water a 30:1:69 (weight ratio), and the volume-based mean particle diameter was 50 nm.

Production Example 11

Aqueous Acid-Modified Polyolefin Dispersion

The maleic acid anhydride-modified propylene-ethylene copolymer (350 g) obtained in Production Example 2, 520 g of tetrahydrofuran, 130 g of propylene glycol monopropyl ether, and 1,000 g of ion exchange water were placed in a 3 L flask equipped with a stirrer, and the mixture was heated to 65° C. for dissolution. Then, 16 g of 50 wt. % aqueous solution of 2-dimethylamino ethanol was added thereto, and the temperature was maintained at 65° C. for 1 hour. Thereafter, the tetrahydrofuran and propylene glycol monopropyl ether were removed for 1.5 hours at an absolute pressure of 93 kPa. The total residual volume of tetrahydrofuran and propylene glycol monopropyl ether was 1 wt. % or less based on the maleic acid anhydride-modified propylene-ethylene copolymer. Subsequently, ion exchange water was added so that the solid content was 30 wt. %, thereby obtaining a milky aqueous modified polyolefin dispersion. The composition of the obtained aqueous modified polyolefin dispersion was maleic acid anhydride-modified propylene-ethylene copolymer:2-dimethylamino ethanol:water=30:1:69 (weight ratio), and the volume-based mean particle diameter was 140 nm.

Production Example 12

Aqueous Acid-Modified Polyolefin Dispersion

The same operation as in Production Example 5 was performed, except that the maleic acid anhydride-modified propylene-ethylene copolymer was changed to the propylene-1-butene copolymer obtained in Production Example 3, and the amount of 50 wt. % aqueous solution of 2-amino-2-methyl-1-propanol was changed to 15 g. The volume-based mean particle diameter of the copolymer in the obtained aqueous modified polyolefin dispersion was 90 nm.

Production Example 13

Aqueous Acid-Modified Polyolefin Dispersion

The same operation as in Production Example 5 was performed, except that the maleic acid anhydride-modified propylene-ethylene copolymer was changed to the propylene-1-butene copolymer obtained in Production Example 4, and the amount of 50 wt. % aqueous solution of 2-amino-2-methyl-1-propanol was changed to 19 g. The volume-based mean particle diameter of the copolymer in the obtained aqueous modified polyolefin dispersion was 160 nm.

Production Example 14

Aqueous Acid-Modified Chlorinated Polyolefin Dispersion

The maleic acid anhydride-modified chlorinated polypropylene (350 g) obtained in Production Example 6, 520 g of tetrahydrofuran, and 130 g of propylene glycol monopropyl ether were placed in a 3 L flask equipped with a stirrer, and the mixture was heated to 65° C. for dissolution. Then, 13 g of 50 wt. % aqueous solution of 2-amino-2-methyl-1-propanol was added thereto. While maintaining the temperature at 65° C., ion exchange water at 60° C. was gradually added dropwise. After 1,000 g of ion exchange water was added dropwise over 1 hour, the tetrahydrofuran and propylene glycol monopropyl ether were removed for 1.5 hours at an absolute pressure of 93 kPa. The total residual volume of tetrahydrofuran and propylene glycol monopropyl ether was 1 wt. % or less based on the maleic acid anhydride-modified chlorinated propylene. Subsequently, ion exchange water was added so that the solid content was 30 wt. %, thereby obtaining a milky aqueous modified polyolefin dispersion. The composition of the obtained aqueous modified polyolefin dispersion was maleic acid anhydride-modified chlorinated polypropylene:2-amino-2-methyl-1-propanol:water=30:1:69 (weight ratio), and the volume-based mean particle diameter was 70 nm.

Production Example 15

Aqueous Acid-Modified Chlorinated Polyolefin Dispersion

The maleic acid anhydride-modified chlorinated polypropylene (350 g) obtained in Production Example 7, 520 g of tetrahydrofuran, 130 g of propylene glycol monopropyl ether, and 1,000 g of ion exchange water were placed in a 3 L flask equipped with a stirrer, and the mixture was heated to 65° C. for dissolution. Then, 17 g of 50 wt. % aqueous solution of 2-dimethylamino ethanol was added thereto, and the temperature was maintained at 65° C. for 1 hour. Thereafter, the tetrahydrofuran and propylene glycol monopropyl ether were removed for 1.5 hours at an absolute pressure of 93 kPa. The total residual volume of tetrahydrofuran and propylene glycol monopropyl ether was 1 wt. % or less based on the maleic acid anhydride-modified chlorinated propylene. Subsequently, ion exchange water was added so that the solid content was 30 wt. %, thereby obtaining a milky aqueous modified polyolefin dispersion. The composition of the obtained aqueous modified polyolefin dispersion was maleic acid anhydride-modified chlorinated polypropylene:2-dimethylamino ethanol:water-30:1:69 (weight ratio), and the volume-based mean particle diameter was 180 nm.

Production Example 16

Aqueous Acid-Modified Chlorinated Polyolefin Dispersion

The same operation as in Production Example 14 was performed, except that the maleic acid anhydride-modified polypropylene was changed to the resin obtained in Production Example 8, and the amount of 50 wt. % aqueous solution of 2-amino-2-methyl-1-propanol was changed to 15 g. The volume-based mean particle diameter of the resin in the obtained aqueous modified polyolefin dispersion was 90 nm.

Production Example 17

Aqueous Acid-Modified Chlorinated Polyolefin Dispersion

The same operation as in Production Example 14 was performed, except that the maleic acid anhydride-modified polypropylene was changed to the resin obtained in Production Example 9, and the amount of 50 wt. % aqueous solution of 2-amino-2-methyl-1-propanol was changed to 21 g. The volume-based mean particle diameter of the resin in the obtained aqueous modified polyolefin dispersion was 130 nm.

Example 1

Aqueous Acid-Modified Polyolefin Dispersion Composition

To the aqueous maleic acid anhydride-modified propylene-ethylene copolymer dispersion in a 3 L flask equipped with a stirrer obtained in Production Example 5, 11.7 g of 30 wt. % aqueous solution of polyoxyethylene lauryl ether (HLB: 15.4) (1 wt. % based on the maleic acid anhydride-modified propylene-ethylene copolymer resin) was added, and the mixture was mixed, thereby obtaining an aqueous modified polyolefin dispersion composition. The volume-based mean particle diameter of the resin in the obtained aqueous modified polyolefin dispersion composition was 50 nm.

Examples 2 to 12

Aqueous Acid-Modified Polyolefin Dispersion Compositions

In Example 1, the aqueous maleic acid anhydride-modified propylene-α-olefin copolymer dispersions of Production Examples 5 to 8 were each used to prepare aqueous modified polyolefin dispersion compositions of the formulations shown in Table 1, in which the type and amount of surfactant were changed.

Comparative Examples 1 to 3

Aqueous Acid-Modified Polyolefin Dispersion Compositions

In Example 1, the aqueous maleic acid anhydride-modified propylene-α-olefin copolymer dispersion of Production Example 5 was used to prepare aqueous modified polyolefin dispersion compositions of the formulations shown in Table 1, in which the type and amount of surfactant were changed.

Comparative Example 4

Aqueous Acid-Modified Polyolefin Dispersion Composition

The maleic acid anhydride-modified propylene-ethylene copolymer (350 g) obtained in Production Example 1, 520 g of tetrahydrofuran, 130 g of propylene glycol monopropyl ether, and 10.5 g of polyoxyethylene lauryl ether (HLB: 15.4) were placed in a 3 L flask equipped with a stirrer, and the mixture was heated to 65° C. for dissolution. Then, 13 g of 50 wt. % aqueous solution of 2-amino-2-methyl-1-propanol was added thereto. While maintaining the temperature at 65° C., ion exchange water at 60° C. was gradually added dropwise. After 1,000 g of ion exchange water was added dropwise over 1 hour, the tetrahydrofuran and propylene glycol monopropyl ether were removed at an absolute pressure of 93 kPa; however, because of vigorous foaming, the removal was carried out while foaming was suppressed and the pressure was controlled (93 kPa to ordinary pressure). Accordingly, the required time was 7.5 hours, which was 5 times longer than the times required in Production Examples 10 to 13. The total residual volume of tetrahydrofuran and propylene glycol monopropyl ether was 1 wt. % or less based on the maleic acid anhydride-modified propylene-ethylene copolymer. Subsequently, ion exchange water was added so that the solid content was 30 wt. %, thereby obtaining an aqueous modified polyolefin dispersion composition. The volume-based mean particle diameter of the resin in the obtained milky aqueous modified polyolefin dispersion composition was 60 nm.

Comparative Example 5

Aqueous Acid-Modified Polyolefin Dispersion Composition

The same operation as in Comparative Example 4 was performed, except that the amount of polyoxyethylene lauryl ether (HLB: 15.4) was changed. The time required for solvent removal was 6 hours. The volume-based mean particle diameter of the resin in the obtained aqueous modified polyolefin dispersion composition was 60 nm.

Example 13

Aqueous Acid-Modified Chlorinated Polyolefin Dispersion Composition

To the aqueous maleic acid anhydride-modified chlorinated polyolefin dispersion in a 3 L flask equipped with a stirrer obtained in Production Example 14, 11.7 g of 30 wt. % aqueous solution of polyoxyethylene lauryl ether (HLB: 16.1) (1 wt. % based on the maleic acid anhydride-modified chlorinated polyolefin resin) was added, and the mixture was mixed, thereby obtaining an aqueous modified polyolefin dispersion composition. The volume-based mean particle diameter of the resin in the obtained aqueous modified polyolefin dispersion composition was 70 nm.

Examples 14 to 24

Aqueous Acid-Modified Chlorinated Polyolefin Dispersion Compositions

In Example 13, the aqueous maleic acid anhydride-modified chlorinated polyolefin dispersions of Production Examples 14 to 17 were each used to prepare aqueous modified polyolefin dispersion compositions of the formulations shown in Table 2, in which the type and amount of surfactant were changed.

Comparative Examples 1 to 3

Aqueous Acid-Modified Chlorinated Polyolefin Dispersion Compositions

In Example 13, the aqueous maleic acid anhydride-modified chlorinated-polyolefin dispersion of Production Example 14 was used to prepare aqueous modified polyolefin dispersion compositions of the formulations shown in Table 2, in which the type and amount of surfactant were changed.

Comparative Example 9

Aqueous Acid-Modified Chlorinated Polyolefin Dispersion Composition

The maleic acid anhydride-modified chlorinated polypropylene (350 g) obtained in Production Example 5, 520 g of tetrahydrofuran, 130 g of propylene glycol monopropyl ether, and 15.75 g of polyoxyethylene lauryl ether (HLB: 16.1) were placed in a 3 L flask equipped with a stirrer, and the mixture was heated to 65° C. for dissolution. Then, 13 g of 50 wt. % aqueous solution of 2-amino-2-methyl-1-propanol was added thereto. While maintaining the temperature at 65° C., ion exchange water at 60° C. was gradually added dropwise. After 1,000 g of ion exchange water was added dropwise over 1 hour, the tetrahydrofuran and propylene glycol monopropyl ether were removed at an absolute pressure of 93 kPa; however, because of vigorous foaming, the removal was carried out while foaming was suppressed and the pressure was controlled. Accordingly, the required time was 7.5 hours, which was 5 times longer than the required times of Production Examples 14 to 17. The total residual volume of tetrahydrofuran and propylene glycol monopropyl ether was 1 wt. % or less based on the maleic acid anhydride-modified chlorinated propylene. Subsequently, ion exchange water was added so that the solid content was 30 wt. %, thereby obtaining an aqueous modified polyolefin dispersion composition. The volume-based mean particle diameter of the resin in the obtained milky aqueous modified polyolefin dispersion composition was 60 nm.

Comparative Example 10

Aqueous Acid-Modified Chlorinated Polyolefin Dispersion Composition

The same operation as in Comparative Example 9 was performed, except that the amount of polyoxyethylene lauryl ether (HLB: 16.1) was changed. The time required for solvent removal was 6 hours. The volume-based mean particle diameter of the resin in the obtained aqueous modified polyolefin dispersion composition was 60 nm.

Test Method
Adhesion Test of Coating Film

The substrates used were an SP-280 molded plate (isotactic polypropylene blended with an ethylene-propylene-diene rubber component; produced by Prime Polymer Co., Ltd.) and a Profax SB823 molded plate (isotactic polypropylene; produced by Himont Basell). Each aqueous modified polyolefin dispersion composition was coated on a substrate using a bar coater so that the amount of coating after drying was about 5 μm, followed by drying at 80° C. for 3 minutes. Subsequently, a urethane coating material Retan (registered trademark) PG80 (produced by Kansai Paint Co., Ltd.) was coated thereon using an air spray gun so that the amount of coating after drying was about 25 μm, followed by drying at 80° C. for 30 minutes. After the coated plate was stored at 25° C. for one day, cuts were made on the coated surface using a cutter knife to form 100 grid patterns at intervals of 1 mm. An adhesive tape LP-18 (produced by Nichiban Co., Ltd.) was closely adhered thereto, and peeled off 10 times at an angle of 180°. When there was no change after the 10th peeling, the score was 10 points, and when the coated surface was peeled off after the first peeling, the score was 0 points. The adhesion is preferably 5 or more, and more preferably 7 or more.

Water Resistance Test of Coating Film

After coated plates obtained in the same manner as in the adhesion test were immersed in warm water at 40° C. for ten days, water on the coated surface was wiped off, and a peel test was performed in the same manner as in the adhesion test. The water resistance is preferably 5 or more, and more preferably 7 or more.

Storage Stability Test

The aqueous acid-modified polyolefin dispersions sealed in glass bottles were stored at 50° C. and −5° C., and the period of time until fluidity was lost to induce solidification was examined up to one year. The storage stability at 50° C. is preferably 6 months or more, and more preferably one year. The storage stability at −5° C. is preferably 3 months or more, and more preferably 6 months or more.

Wettability

In the above adhesion test of the coating films, wettability was visually evaluated when each acid aqueous modified polyolefin dispersion composition was applied to the substrate. Excellent wettability was evaluated as "A," and poor wettability was evaluated as "B."

TABLE 1

| | | Comp. Ex. 1 | Ex. 1 | Ex. 2 | Ex. 3 | Comp. Ex. 2 | Ex. 4 | Ex. 5 | Ex. 6 | Comp. Ex. 3 | Ex. 7 | Ex. 8 | Ex. 9 | Ex. 10 | Ex. 11 | Ex. 12 | Comp. Ex. 4 | Comp. Ex. 5 |
|---|---|---|---|---|---|---|---|---|---|---|---|---|---|---|---|---|---|---|
| | | Prod. Ex. 10 | Prod. Ex. 10 | Prod. Ex. 10 | Prod. Ex. 10 | Prod. Ex. 10 | Prod. Ex. 10 | Prod. Ex. 10 | Prod. Ex. 10 | Prod. Ex. 10 | Prod. Ex. 10 | Prod. Ex. 10 | Prod. Ex. 10 | Prod. Ex. 11 | Prod. Ex. 12 | Prod. Ex. 13 | Prod. Ex. 1 | Prod. Ex. 1 |
| | | \multicolumn{15}{Aqueous acid-modified polyolefin dispersion} | | |
| | | | | | | | | | | | | | | | | | \multicolumn{2}{Aqueous acid-modified polyolefin dispersion composition} |
| Mixing step of surfactant | Step 1 Amount of polyoxyethylene lauryl ether (HLB: 15.4) based on acid-modified propylene-α-olefin (wt. %) | — | 1 | — | — | — | — | — | — | — | — | — | — | — | — | — | 3 | 1 |
| | Step 2 Amount of polyoxyethylene lauryl ether (HLB: 15.4) based on acid-modified propylene-α-olefin (wt. %) | — | — | 3 | 8 | 12 | — | — | — | — | — | — | — | — | — | — | — | — |
| | Amount of polyoxyethylene lauryl ether (HLB: 9.5) based on acid-modified propylene-α-olefin (wt. %) | — | — | — | — | — | 1 | 3 | 8 | 12 | — | — | — | — | — | — | — | — |
| | Amount of polyoxyethylene lauryl ether (HLB: 7.5) based on acid-modified propylene-α-olefin (wt. %) | — | — | — | — | — | — | — | — | — | 1 | 3 | — | — | — | — | — | — |
| | Amount of polyoxyethylene stearyl ether (HLB: 13.5) based on acid-modified propylene-α-olefin (wt. %) | — | — | — | — | — | — | — | — | — | — | — | 8 | — | — | — | — | — |
| | Amount of polyoxyethylene tridecyl ether (HLB: 14.5) based on acid-modified propylene-α-olefin (wt. %) | — | — | — | — | — | — | — | — | — | — | — | — | 3 | 3 | — | — | — |
| | Amount of polyoxyethylene styrenated phenyl ether (HLB: 12.7) based on acid-modified propylene-α-olefin (wt. %) | — | — | — | — | — | — | — | — | — | — | — | — | — | — | 3 | — | — |
| Organic solvent removal (concentration) time (h) | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 7.5 | 6 |
| Mean particle diameter of resin in aqueous acid-modified polyolefin dispersion composition (nm) | | 50 | 50 | 50 | 50 | 50 | 50 | 50 | 50 | 50 | 50 | 50 | 50 | 140 | 90 | 160 | 60 | 50 |
| Adhesion | SP-280 | 3 | 10 | 10 | 10 | 10 | 10 | 10 | 10 | 10 | 10 | 10 | 10 | 10 | 10 | 10 | 10 | 10 |
| Adhesion | SB828 | 2 | 7 | 10 | 10 | 10 | 8 | 10 | 10 | 10 | 7 | 10 | 10 | 10 | 10 | 10 | 10 | 7 |
| Water resistance | SP-280 | 2 | 10 | 10 | 10 | 3 | 10 | 10 | 10 | 6 | 10 | 10 | 7 | 10 | 10 | 10 | 10 | 10 |
| Water resistance | SB828 | 1 | 7 | 10 | 8 | 1 | 8 | 10 | 10 | 1 | 7 | 10 | 5 | 10 | 10 | 10 | 10 | 7 |
| Storage stability | 50° C. | 6 Mo. | 1 Yr. | 1 Yr. | 1 Yr. | 1 Yr. | 1 Yr. | 1 Yr. | 1 Yr. | 1 Yr. | 6 Mo. | 3 Mo. | 3 Mo. | 1 Yr. | 1 Yr. | 1 Yr. | 1 Yr. | 1 Yr. |
| Storage stability | −5° C. | 1 Mo. | 6 Mo. | 1 Yr. | 1 Yr. | 1 Yr. | 6 Mo. | 1 Yr. | 1 Yr. | 1 Yr. | 1 Yr. | 1 Mo. | 1 Mo. | 1 Yr. | 1 Yr. | 1 Yr. | 1 Yr. | 6 Mo. |
| Wettability | SB828 | B | A | A | A | A | A | A | A | A | A | A | A | A | A | A | A | A |

TABLE 2

| | | Comp. Ex. 6 | Ex. 13 | Ex. 14 | Ex. 15 | Comp. Ex. 7 | Ex. 16 | Ex. 17 | Ex. 18 | Comp. Ex. 8 | Ex. 19 | Ex. 20 | Ex. 21 | Ex. 22 | Ex. 23 | Ex. 24 | Comp. Ex. 9 | Comp. Ex. 10 |
|---|---|---|---|---|---|---|---|---|---|---|---|---|---|---|---|---|---|---|
| | | Prod. Ex. 14 | Prod. Ex. 14 | Prod. Ex. 14 | Prod. Ex. 14 | Prod. Ex. 14 | Prod. Ex. 14 | Prod. Ex. 14 | Prod. Ex. 14 | Prod. Ex. 14 | Prod. Ex. 14 | Prod. Ex. 14 | Prod. Ex. 14 | Prod. Ex. 15 | Prod. Ex. 16 | Prod. Ex. 17 | Prod. Ex. 6 | Prod. Ex. 6 |
| | | \multicolumn{17}{l}{Aqueous acid-modified chlorinated polyolefin resin dispersion composition} |
| | | \multicolumn{15}{l}{Aqueous acid-modified chlorinated polyolefin resin dispersion} | | |
| Mixing step of surfactant | Step 1 Amount of polyoxyethylene lauryl ether (HLB: 16.1) based on acid-modified chlorinated polyolefin (wt. %) | — | 1 | 3 | 8 | 12 | — | — | — | — | — | — | — | — | — | — | 4.5 | 1 |
| | Step 2 Amount of polyoxyethylene lauryl ether (HLB: 16.1) based on acid-modified chlorinated polyolefin (wt. %) | — | — | — | — | — | 1 | 3 | 8 | 12 | — | — | — | — | — | — | — | — |
| | Amount of polyoxyethylene lauryl ether (HLB: 9.5) based on acid-modified chlorinated polyolefin (wt. %) | — | — | — | — | — | — | — | — | — | 1 | 3 | 8 | — | — | — | — | — |
| | Amount of polyoxyethylene lauryl ether (HLB: 7.5) based on acid-modified chlorinated polyolefin (wt. %) | — | — | — | — | — | — | — | — | — | — | — | — | — | — | — | — | — |
| | Amount of polyoxyethylene stearyl ether (HLB: 13.5) based on acid-modified chlorinated polyolefin (wt. %) | — | — | — | — | — | — | — | — | — | — | — | — | 3 | — | — | — | — |
| | Amount of polyoxyethylene tridecyl ether (HLB: 14.5) based on acid-modified chlorinated polyolefin (wt. %) | — | — | — | — | — | — | — | — | — | — | — | — | — | 3 | — | — | — |
| | Amount of polyoxyethylene styrenated phenyl ether (HLB: 12.7) based on acid-modified chlorinated polyolefin (wt. %) | — | — | — | — | — | — | — | — | — | — | — | — | — | — | 3 | — | — |
| Organic solvent removal (concentration) time (h) | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 7.5 | 6 |
| Mean particle diameter of resin in aqueous acid-modified polyolefin dispersion composition (nm) | | 70 | 70 | 70 | 70 | 70 | 70 | 70 | 70 | 70 | 70 | 70 | 70 | 180 | 90 | 130 | 60 | 70 |
| Adhesion SP-280 | | 5 | 10 | 10 | 10 | 10 | 10 | 10 | 10 | 10 | 10 | 10 | 10 | 10 | 10 | 10 | 10 | 10 |
| Adhesion SB828 | | 3 | 7 | 10 | 10 | 10 | 8 | 10 | 10 | 10 | 7 | 10 | 10 | 10 | 10 | 10 | 10 | 7 |
| Water resistance SP-280 | | 4 | 10 | 10 | 10 | 5 | 10 | 10 | 10 | 5 | 10 | 10 | 5 | 10 | 10 | 10 | 10 | 10 |
| Water resistance SB828 | | 2 | 7 | 10 | 10 | 1 | 8 | 10 | 10 | 1 | 7 | 10 | 1 | 10 | 10 | 10 | 10 | 7 |
| Storage stability 50° C. | | 6 Mo. | 1 Yr. | 1 Yr. | 1 Yr. | 1 Yr. | 1 Yr. | 1 Yr. | 1 Yr. | 1 Yr. | 6 Mo. | 3 Mo. | 3 Mo. | 1 Yr. | 1 Yr. | 1 Yr. | 1 Yr. | 1 Yr. |
| Storage stability −5° C. | | 1 Mo. | 6 Mo. | 1 Yr. | 1 Yr. | 1 Yr. | 6 Mo. | 1 Yr. | 1 Yr. | 6 Mo. | 1 Mo. | 1 Mo. | 1 Mo. | 1 Yr. | 1 Yr. | 1 Yr. | 1 Yr. | 6 Mo. |
| Wettability SB828 | | B | A | A | A | A | A | A | A | A | A | A | A | A | A | A | A | A |

INDUSTRIAL APPLICABILITY

Due to the specific steps, the method for producing an aqueous modified polyolefin dispersion composition according to the present invention can prevent foaming during the removal of the organic solvent, and can significantly reduce the processing time. Furthermore, because a surfactant is mixed after the organic solvent is removed, the type and amount of surfactant can be suitably selected depending on the application of the aqueous modified polyolefin dispersion composition. The obtained aqueous modified polyolefin dispersion composition has excellent adhesion and water resistance. The aqueous modified polyolefin dispersion composition of the present invention is useful as a polyolefin part material for automobiles, etc., a coating material for polyolefin films, etc., and an aqueous resin composition for inks, adhesives, etc.

The invention claimed is:

1. A method for producing an aqueous modified polyolefin dispersion composition comprising the steps (1) and (2):
   (1) step 1 of combining a modified polyolefin having an acid value of 5 to 50 KOHmg/g, an organic solvent, a base compound, and water as starting materials, to obtain an aqueous modified polyolefin dispersion; and
   (2) step 2 of mixing a surfactant with the aqueous modified polyolefin dispersion in an amount of 0.1 to 10 wt. % based on the weight of the modified polyolefin.

2. The method according to claim 1, wherein the modified polyolefin is an acid-modified polyolefin and/or an acid-modified chlorinated polyolefin.

3. The method according to claim 1, wherein the acid-modified chlorinated polyolefin has a chlorine content of 10 to 35 wt. %.

4. The method according to claim 1, wherein the modified polyolefin has a weight average molecular weight of 10,000 to 150,000.

5. The method according to claim 1, wherein the modified polyolefin is obtained by acid-modifying a propylene-α-olefin copolymer, or by acid-modifying a propylene-α-olefin copolymer, followed by chlorination, and the propylene-α-olefin copolymer has a propylene component content of 60 to 97 mol %.

6. The method according to claim 5, wherein the propylene-α-olefin copolymer is a propylene-α-olefin copolymer synthesized using a metallocene catalyst.

7. The method according to claim 1, wherein the organic solvent includes at least an ether-based solvent.

8. The method according to claim 1, wherein the surfactant is a nonionic surfactant having an HLB of 9 or more.

9. The method according to claim 8, wherein the nonionic surfactant having an HLB of 9 or more is at least one selected from the group consisting of:
   a polyoxyalkylene alkyl ether-based surfactant,
   a polyoxyalkylene styrenated phenyl ether-based surfactant,
   a polyoxyalkylene alkyl phenyl ether-based surfactant,
   a polyoxyalkylene alkyl amine-based surfactant,
   a polyoxyalkylene amine-based surfactant,
   a polyoxyalkylene alkyl amide-based surfactant,
   a polyoxyalkylene fatty acid ester-based surfactant,
   an ethylene oxide-propylene oxide block polymer-based surfactant,
   an ethylene oxide-propylene oxide random polymer-based surfactant, and
   a polyoxyethylene sorbitan fatty acid ester-based surfactant.

* * * * *